(12) United States Patent
Laanti

(10) Patent No.: US 7,260,202 B2
(45) Date of Patent: Aug. 21, 2007

(54) WAIT-TIME SERVICE IN A TELECOMMUNICATIONS NETWORK

(75) Inventor: Maarit Laanti, Espoo (FI)

(73) Assignee: Nokia Corporation, Espoo (FI)

( * ) Notice: Subject to any disclaimer, the term of this patent is extended or adjusted under 35 U.S.C. 154(b) by 738 days.

(21) Appl. No.: 10/432,532

(22) PCT Filed: Nov. 29, 2000

(86) PCT No.: PCT/FI00/01042

§ 371 (c)(1),
(2), (4) Date: Aug. 25, 2003

(87) PCT Pub. No.: WO02/45395

PCT Pub. Date: Jun. 6, 2002

(65) Prior Publication Data

US 2004/0028214 A1 Feb. 12, 2004

(51) Int. Cl.
*H04M 3/42* (2006.01)
(52) U.S. Cl. .............................. 379/209.01; 379/207.06
(58) Field of Classification Search .......... 379/209.01, 379/215.01, 207.04, 207.05, 207.06, 207.07
See application file for complete search history.

(56) References Cited

U.S. PATENT DOCUMENTS

| | | | |
|---|---|---|---|
| 4,166,929 A * | 9/1979 | Sheinbein .............. | 379/209.01 |
| 4,947,421 A | 8/1990 | Toy et al. | |
| 5,268,957 A * | 12/1993 | Albrecht ................ | 379/209.01 |
| 5,521,965 A * | 5/1996 | D'Alessio et al. ..... | 379/209.01 |
| 5,680,447 A | 10/1997 | Diamond et al. | |
| 5,784,438 A * | 7/1998 | Martinez .................. | 379/67.1 |
| 6,009,157 A * | 12/1999 | Bales et al. ............ | 379/209.01 |
| 6,035,031 A * | 3/2000 | Silverman .............. | 379/209.01 |

FOREIGN PATENT DOCUMENTS

EP    0 434 239 A2    6/1991

OTHER PUBLICATIONS

ETSI TS 101 283 V7.0.0 (Aug. 1999), Technical Specification, "Digital Cellular Telecommunications System (Phase 2+); Technical Realization of Completion of Calls to Busy Subscriber (CCBS); Stage 2 (GSM 03.93 version 7.0.0 Release 1997)", GSM., pp. 9-25.

* cited by examiner

*Primary Examiner*—Bing Q. Bui
(74) *Attorney, Agent, or Firm*—Squire, Sanders & Dempsey L.L.P.

(57) ABSTRACT

A method for providing a wait-time service in a telecommunications network and a telecommunications system, comprising user terminals connected to a network via radio path. When a terminal user must wait for a requested service from the service provider, this is often indicated by a queue tone, a busy tone, or a piece of music, depending on the terminal used. The objective of this invention is, on the one hand, to avoid compressing and coding messages, such as a piece of music, and on the other hand, to avoid wasting a lot of spectrum. This objective is achieved by offering a new service by means of which it is possible to start and execute a wait-time service at the terminal of the user when the requested connection is not available immediately. However, the wait-time service can be provided in fixed networks, too.

32 Claims, 6 Drawing Sheets

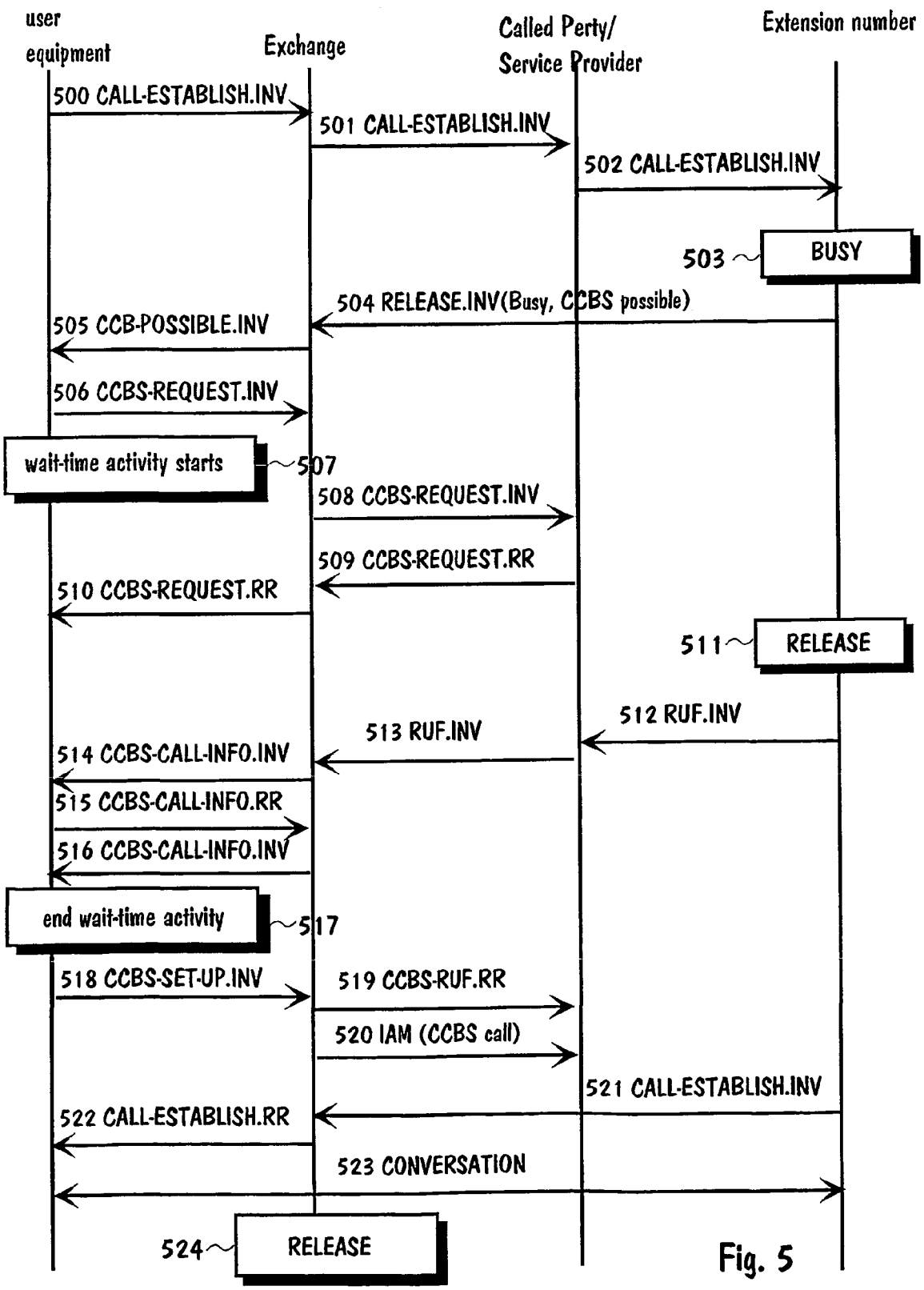

WAIT-TIME SERVICE IN A TELECOMMUNICATIONS NETWORK

FIELD OF THE INVENTION

The present invention relates in general to services in a telecommunications network, especially wait-time services.

BACKGROUND OF THE INVENTION

FIG. 1a shows with a simplified block diagram a GSM network (Global System for Mobile communications).

The network subsystem NSS 100 of the GSM system comprises a mobile services switching center MSC 101 connected to other networks through the interface of the NSS, such as a public-switched telephone network PSTN, an integrated services digital network ISDN, public land mobile networks PLMN, packet-switched public data networks PSPDN, and circuit-switched public data networks CSPDN. A base station subsystem BSS 102 is located between A and air interfaces comprising base station controllers BSC 103, each controlling the base transceiver stations BTS 104 connected to them. The base stations, on the other hand, are in radio communication with mobile stations MS 105 across the air interface.

The GSM network has a digital radio path, i.e. bits are transferred through the air interface. The GSM system uses coding to convert speech into bits and decoding to reconstruct speech back into its original form. A transcoder TC (not shown in the figure) located in the BSS encodes the downlink transmissions, and a mobile station encodes the uplink transmissions. By using the coding system, speech coding requires only 13 kbit/s instead of the 64 kbit/s used in other networks, e.g. PSTN.

In order to establish a call, a mobile station MS must have a connection through the air and the base station system. This connection may be either a signaling type of connection or a traffic (speech, data) type of connection. Call control functions are handled by the NSS part of the GSM network. Via the base station system, the mobile switching center provides the connection between the mobile station and the external networks.

FIG. 1b shows some of the messages, which are generally used at call establishment between a calling and a called party.

In the following the call establishment of a mobile originated call is considered. When a calling party MS wishes to request a service, the user first dials the number and lifts the handset of the phone, or pushes a button when a mobile phone is in question. A REQUEST-FOR-SERVICE signal 100 is sent on a random access channel RACH to the network, indicating that the calling party requires a speech channel. For the sake of simplicity, signaling is performed between the calling party and a mobile switching center MSC. In fact, a number of signaling message exchanges are required among the mobile station, the serving base station BTS, and the serving base controller station BSC before signaling reaches the serving mobile switching center. Parameters such as the power level and the channel number are determined. Mobile switching center/base controller station responses with a free channel number and a REQUEST-ADDRESS message 101 are sent from the mobile switching center to the mobile station. The mobile station is designated a dedicated channel. The message 101 is an inquiry about the number of the called party. The mobile station responds by sending a PROVIDE-ADDRESS message 102, including the number in question, to the mobile switching center. Information is processed in the mobile switching center 103. The processing includes routing to the destination, initialization of billing, HLR (Home Location Register) and VLR (Visitor Location Register) verifications, allocation of a speech channel, etc.

It is assumed that the destination of the call, the called party, is in this particular example an extension number. In this case, an ALERT-CALLED-PARTY message 104 is sent from the mobile switching center to the switchboard of the called party. The switchboard checks whether the called party, the extension number, is ready to receive the incoming call. This happens so that an ALERT-CALLED-PARTY message 104, containing a call line indication CLI, is sent further to the extension number of the called party. This message activates a ringing tone in the equipment of the called party. If the called party is already engaged in communication, at step 105, notification is given with a busy tone 106. First, the switchboard informs the calling subscriber of this by sending a SWITCHBOARD-ANSWER message 107 through the signaling channel, and a traffic channel is activated for speech at the mobile switching center. Then a switchboard operator and the calling party discuss the matter. If the calling party decides to wait for the service, the switchboard operator switches on a queue tone or a piece of music.

Generally speaking, the waiting time varies for different services, but from the subscriber's point of view, the waiting usually seems to be too long. Service providers have solved this problem in various ways. Information can be given regularly to the calling party with a recorded voice saying that the company has not yet been able to complete the call. More often a queue tone or alternatively a piece of music is played on the line to indicate that the calling party is on queue for the service.

From time to time the switchboard tries to contact the called party by recalling, steps 109-112. Finally, when the called party answers by lifting the handset of her/his telephone, an OK message 113 is sent from the telephone equipment to the switchboard. The call connection is established between the calling and the called party, and the conversation can begin 114. The conversation can be terminated at any moment when either of the two subscribers hangs up 115.

Depending on the service provider, a busy tone, a queue tone, or a piece of music is sent to the calling party when the destination is found to be already busy. It is especially important to note that the queue tone or piece of music is sent through the air to the mobile station in the same manner as speech. That is, the piece of music is sent on a TCH channel (Traffic CHannel). This is, however, wasting a lot of spectrum. It is a known problem that the frequency range is limited. Therefore, it is not economical to use the frequencies only for sending either a queue tone or a piece of music on a speech channel. The limited scope of the frequencies and the continually increasing need to share out frequencies among network subscribers requires that the frequencies be used in a more efficient and economic way.

Another problem is the poor quality of music when it is sent through a radio path. One important reason for the poor sound quality is that the piece of music is compressed and coded into bits in the same manner as normal speech; originally compressing and coding was optimized for speech.

In particular, all kinds of conversions degenerate the tone quality. When the subscriber listens to a piece of music of poor quality, the impression may be the opposite to that which the service provider desires. Still another problem is that the subscriber may not necessarily want to listen to that certain piece of music but can't in any way act to change the situation.

SUMMARY OF THE INVENTION

The purpose of the invention is to eliminate the drawbacks described above and to bring about a method providing a wait-time service of high quality and allowing the efficient avoidance of the unnecessary usage of traffic channels on the air interface in the telecommunications network.

This objective is achieved with the solution defined in the independent claims.

When a first party requests a service from a service provider in a telecommunications network, a connection to a second party, for example, the first party, often has to wait for the requested service. The situation is indicated by a queue tone, a busy tone, a piece of music, or in some other way, depending on the service provider and the terminal used.

The objective is to offer a new wait-time service which can be started at the terminal of the subscriber when the requested connection is not available immediately. The wait-time service can be activated by a message sent either from a serving exchange or the user of the terminal. The type of service may be the provision of audio, video, textual, or still-image information, for example, and it is predefined in the terminal by the end user. A traffic channel is not opened through the air interface during the wait-time service.

When the wait-time service is activated at the terminal the serving exchange removes the connection control from the first serving exchange to the second serving exchange,where the predefined status of the second party is monitored. The first exchange may sometimes be the same as the second exchange.

When the actual requested service connection can be established in response to the said monitoring, the wait-time service is interrupted by an alert signal when the priority is higher than the priority of the wait-time service.

It is possible to restart the interrupted wait-time service, if desired, when the actual requested service has been released.

Downlink frequencies are used more economically at the air interface, because the traffic channel is not opened for the wait-time but only when the actual service can be offered to the end user.

BRIEF DESCRIPTION OF THE DRAWINGS

The invention is described more closely with reference to the accompanying drawings, in which FIGS. 2-5 are signaling charts illustrating the call message transmission between different components in the network.

DETAILED DESCRIPTION OF THE INVENTION

In the following, the present invention is illustrated with four examples. The first and third examples relate to a voice call connection and the second and fourth examples to a data call connection in a telecommunications network.

The present invention can be applied to any mobile communication system as well as any kind of telecommunications network. The invention will be described below in more detail, mostly by using the GSM (Global System for Mobile Communications) system as an example.

In the following, the first implementation of the wait-time service in a telecommunications network is described with reference to FIG. 2.

As an example, a voice call establishment is considered. A mobile subscriber wants to make a call to a subscriber, who in this particular example is a fixed telephone subscriber.

Figure 1A:
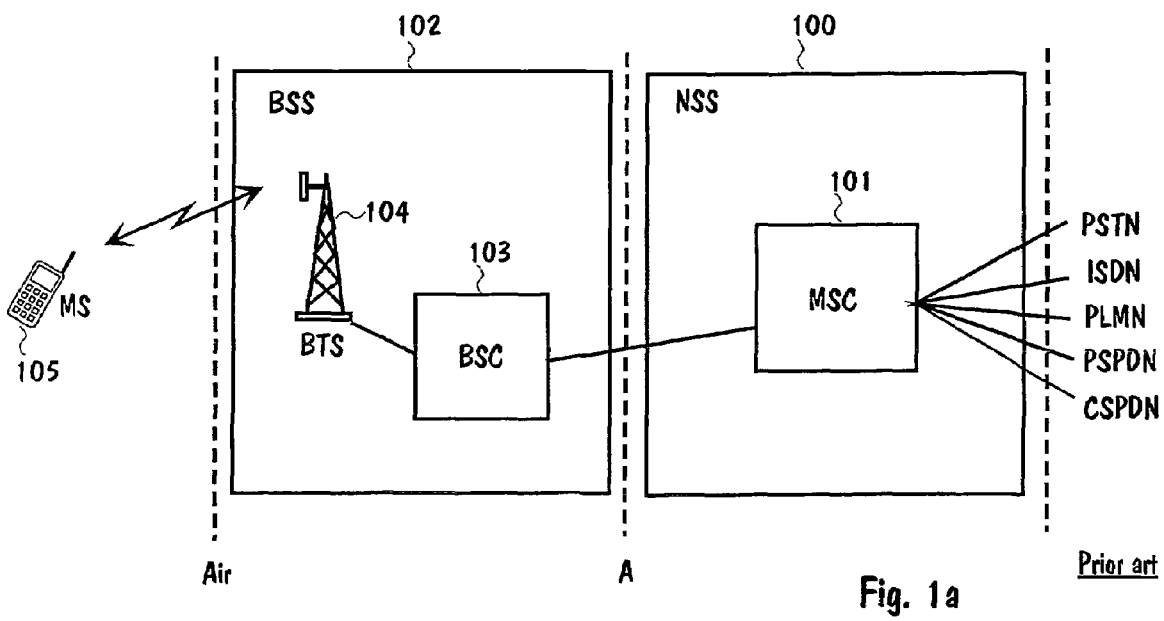
FIG. 1a shows the structure of a known mobile network system.
Figure 1B:
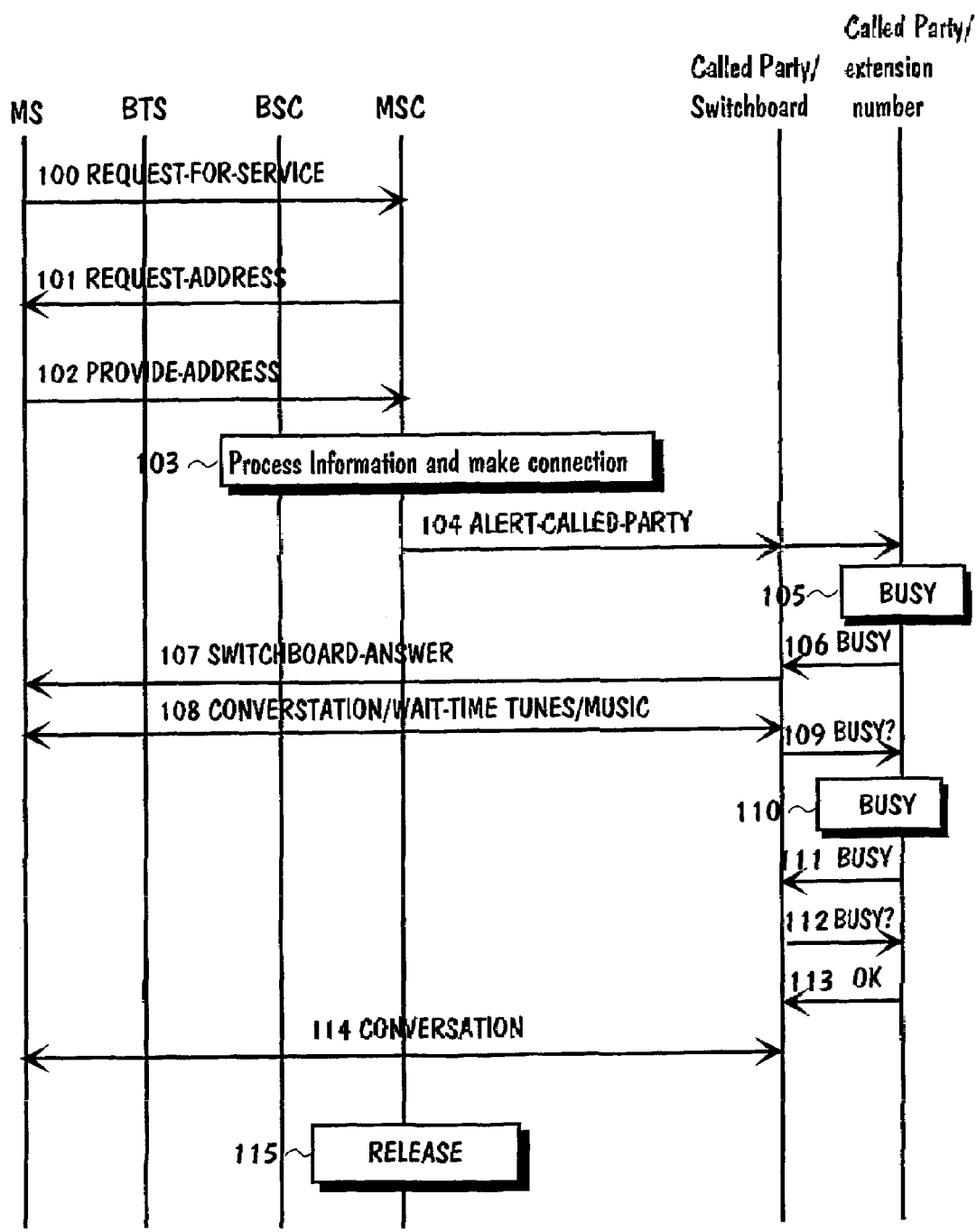
FIG. 1b is a signaling chart illustrating a known call establishment between a calling and a called party in a telecommunications network.
Figure 2:
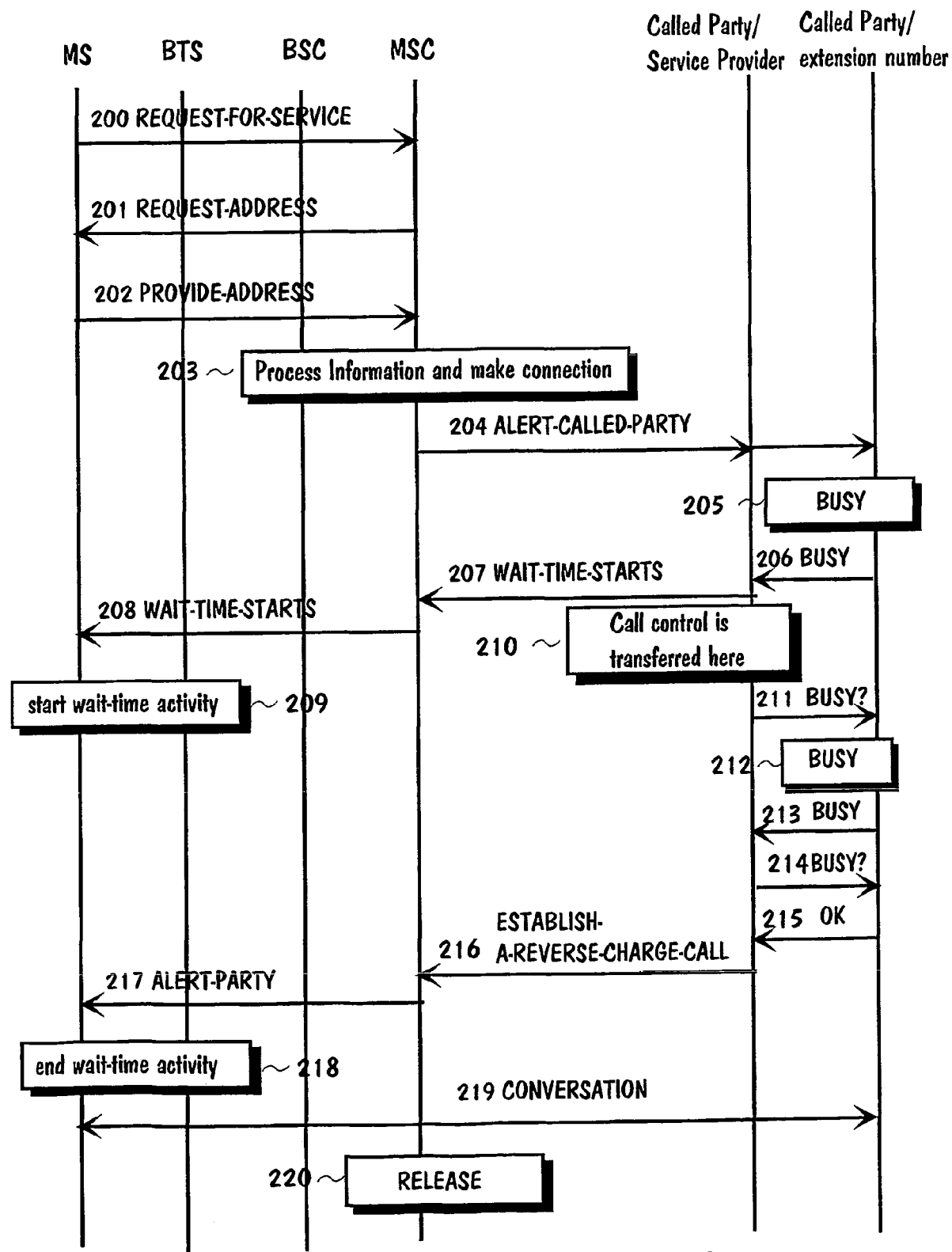

Steps 200-206 in FIG. 2 correspond to steps 100-106 in FIG. 1. The service provider, which corresponds to the switchboard in FIG. 1, saves a call line identification in the memory and sends a WAIT-TIME-STARTS message via the serving mobile switching center to the mobile station, steps 207 and 208. In response to that message, the mobile switching center cancels the speech channel allocation made during the processing (at step 203). At the same time the call control 210 is transferred from the mobile switching center to the service provider.

The WAIT-TIME-STARTS message is sent to the mobile station through the signaling channel. It is worth noting that no speech channel has yet been opened. The WAIT-TIME-STARTS message automatically activates at the mobile station (step 209) a predefined wait-time service; such as a piece of music, which was stored earlier in the mobile equipment by the end user. A codec in the mobile equipment generates the music from a set of parameters, which can either be stored in the mobile equipment or sent from the network.

From now on, the service provider is in charge of the call establishment. Its first task is to find out when the called party, i.e. the extension number is free to receive the incoming call (steps 211-214). Once the called party is ready to receive the call, an OK message 215 is sent from the equipment of the called party to the service provider. Due to the fact that the call control is at the service provider, the call is now established in the reverse direction, i.e. from the called party to the calling party. The call establishment is started as a normal voice call, but now in the opposite direction to the original call establishment. An ESTABLISH-A-REVERSE-CHARGE-CALL message 216 is sent from the service provider to the mobile switching center. A reverse charge call facility allows the called party, here the original calling party, to be charged for the actual communication. The sent message contains the telephone number of the original calling party, which was saved by the service provider at the latest at the same time when the call control was transferred from the mobile switching center. The location of the mobile station (the original calling party) is paged, i.e. an inquiry is made as to where the mobile station concerned is at the moment. When the location is made known, a ringing tone ALERT-PARTY 217 is sent to the mobile station. If either the called party, i.e. the original calling party, or the network is busy, the service provider tries to establish the call repeatedly according to specific rules, e.g. according to 1) the number of calls and 2) the length of intervals between the calls.

As the priority of the ringing tone is higher than the priority of the wait-time service, the piece of music is interrupted, at step 218, and the mobile equipment sounds an alarm. When the mobile station answers, a speech path is opened, and the conversation 219 can begin. Termination of the call can be carried out in the customary way, i.e., the call can be released by either of the end users (step 220).

After release of the connection, the following text appears on the display of the mobile equipment: "Do you wish to continue the interrupted activity?" The user of the mobile equipment has two alternative responses: either "ok" or "delete". Thus the user has an opportunity to return to the activity that was interrupted, perhaps at an interesting moment.

The above-described solution has many advantages. First of all, the use of frequencies in the air interface is economized Secondly, the quality of music is satisfactory. Thirdly, the subscriber is further satisfied because the piece of music has been chosen by herself/himself. Instead of music, the activity recorded in advance can be speech, e.g. aphorism(s), poem(s) or a short story. An activity can be accepted or deleted according to the subscriber's wish.

The second example relates to a data call connection in a GSM network.

Figure 3:
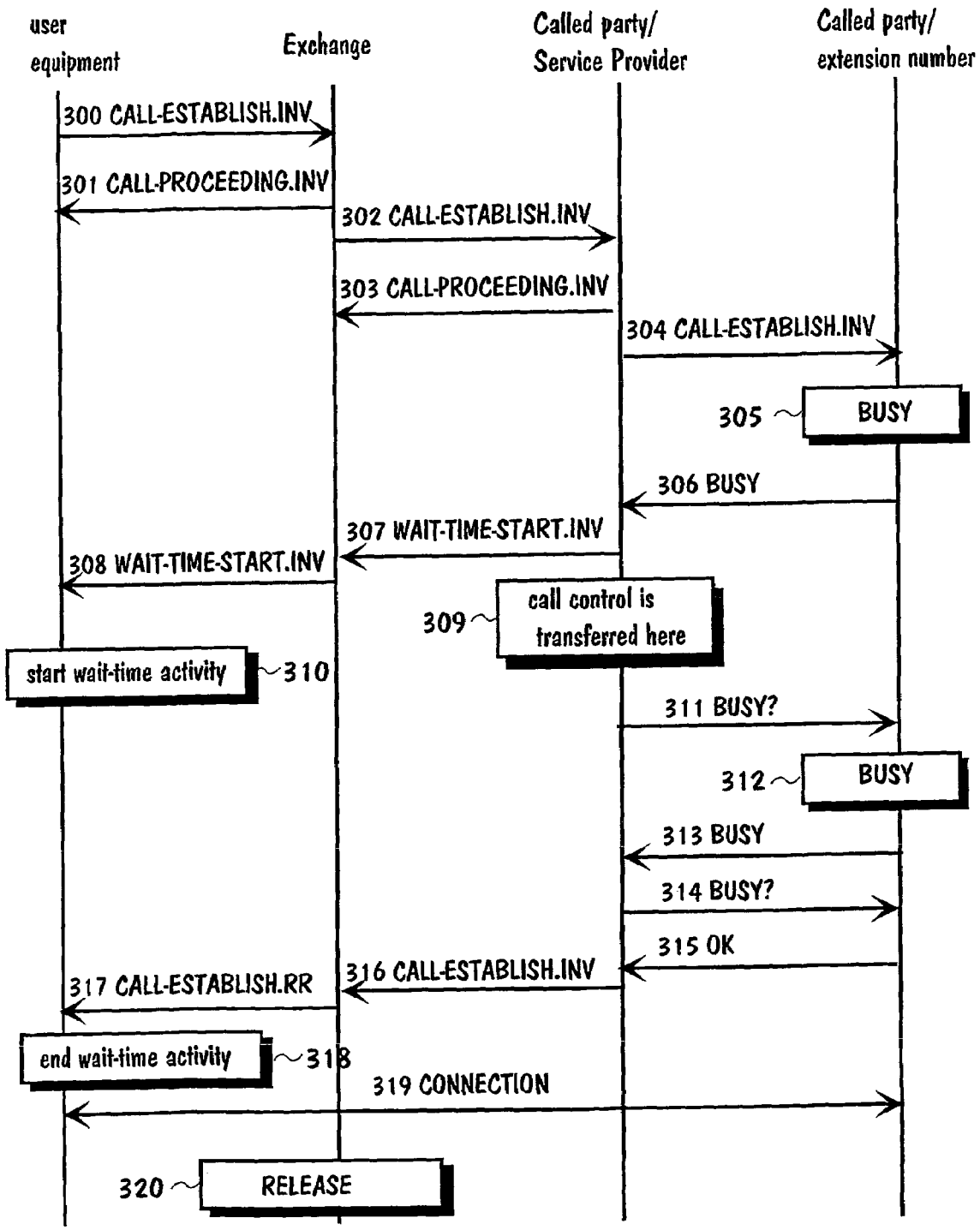

FIG. 3 illustrates a data call connection. In principle the signaling corresponds to the signaling in the previous example, but the names of the signals differ from one another.

A calling party, referred to here as "user equipment", requests a service, such as a database search or a search in the World Wide Web. A CALL-ESTABLISH.INV message 300, including the destination address, is sent via an exchange and a service provider (step 302) to the final destination, here an extension number (step 304). When the message 300 sent by the user equipment is received by the exchange, the exchange sends the user equipment an acknowledgment of this, CALL-PROCESS.INV message 301. The exchange processes the message 300 received and forwards it in the form of CALL-ESTABLISH.INV message 302 to the service provider, which sends the exchange an acknowledgement of receipt in the form of CALL-PRO-CEEDING message 303.

The extension number is already engaged with another connection, i.e. the called party can not be reached at the moment (step 305). In response to this message, a busy signal 306 is sent to the service provider. This signal activates the service provider to save the number of the called party and to send a WAIT-TIME-STARTS.INV message via the exchange to the user equipment, steps 307 and 308. A speech channel is not opened. Instead, the channel allocation message is canceled at the exchange, and the call control is transferred 309 from the exchange to the service provider. When the message 308 has been received, a wait-time activity is automatically activated at the user's equipment (step 310).

In data connections the wait-time activity can also be visual or even audiovisual. Making good use of wafting time, the user may have one activity or a plurality of various kinds of activities saved in the user equipment. Depending on the type of user equipment, these activities could be: quizzes, games, aphorisms, pictures, comics, etc.

The service provider monitors the state of the extension number of the called party (steps 311-314). Immediately after an OK message, at step 315, is received, a CALL-ESTABLISH.INV message 316 is sent to the exchange. This message corresponds to the ESTABLISH-A-REVERSE-CHARGE-CALL message in the previous example, i.e. the original calling party is to be charged.

The exchange then sends a CALL-ESTABLISH.RR message 317 to the user equipment. The activity in the user equipment is immediately interrupted (step 318), and the data connection 319 can be established between the user equipment and the called party. Release can be initiated by either of the two parties (step 320).

If the activity was a game that was interrupted at a very exciting moment, the user can activate the game again after the actual connection because the status of the game is automatically saved when the game is stopped by an alert message. Of course, the user always has the option of accepting or rejecting the activity.

If the activity is an aphorism, a poem, or a picture, this stays on the display until the user requests the next display or another activity.

Common to each of the wait-time services above is that
1) the user has stored the activity in the mobile equipment beforehand,
2) the activity is started, saved, and controlled by the mobile equipment itself, that is, the user can decide at which volume the music is to be played, as well as which pieces are to be played and in which order, etc.,
3) the activity starts when the WAIT-TIME-STARTS message is received by the user equipment from the exchange,
4) the activity is ended when an ALERT message is received by the user equipment from the exchange, and
5) the interrupted activity can be resumed after the actual requested service has ended, if the user so desires.

An advantageous way to activate a wait-time activity in the mobile equipment is to use a supplementary service CCBS (Completion of Calls to Busy Subscriber) facility, whereby the calling party asks the network to monitor when the called party is free. The call is completed automatically by the network without the need to redial the called number when the called line becomes free. The availability of this supplementary service depends on the network operator and the existing exchanges.

Figure 4:
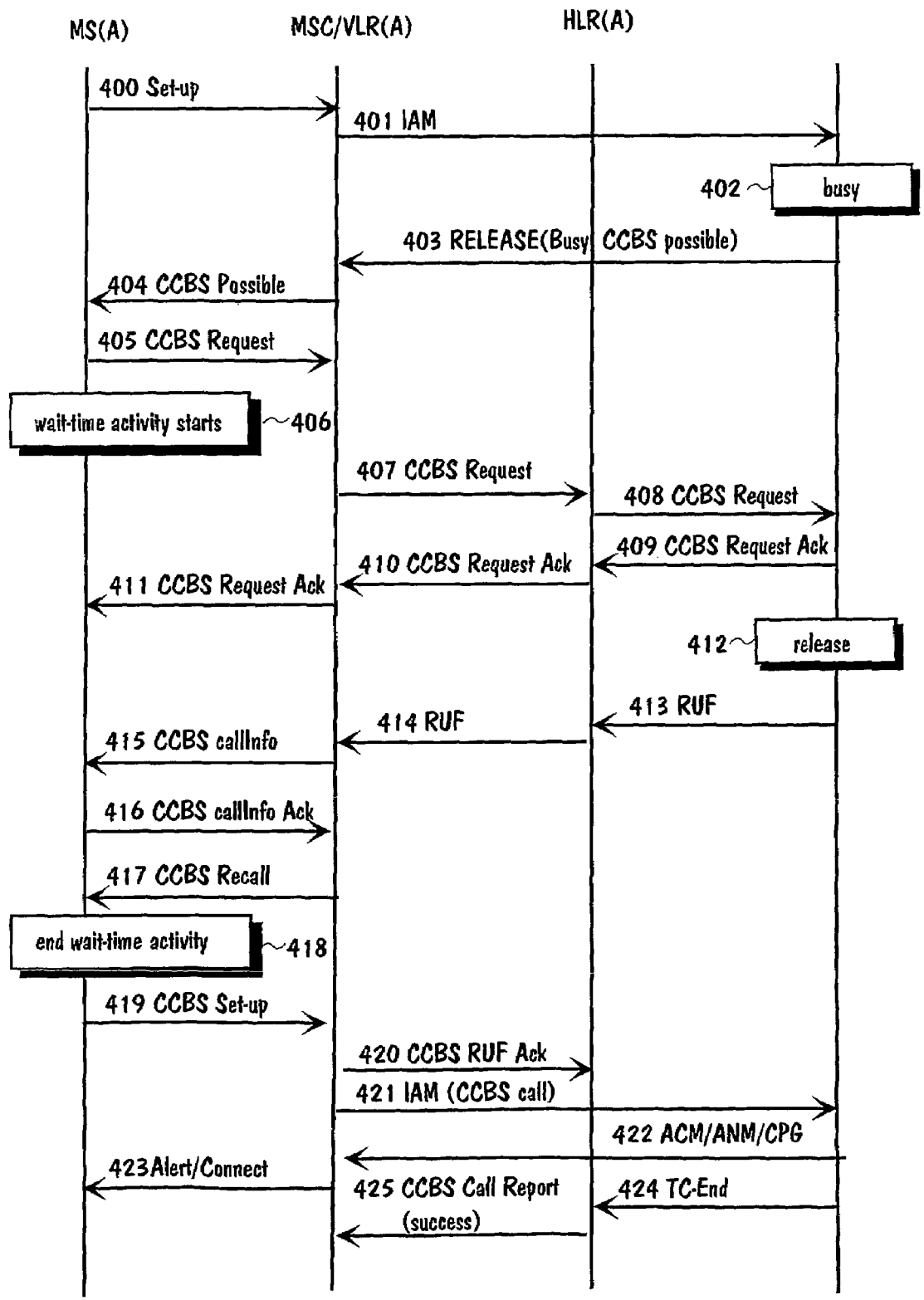

FIG. 4 relates to a voice call connection and FIG. 5 to a data call connection in a telecommunications network.

In FIG. 4 the mobile subscriber sends a SET-UP message 400 to the mobile switching center. In response to the received message, the mobile switching center sends a INITIAL-ADDRESS MESSAGE 401 to the called subscriber DLE(B), which can be either a mobile subscriber or a fixed phone subscriber. If the called subscriber is busy 402, a RELEASE(busy, CCBS possible) message 403 is sent from the called subscriber's terminal to the mobile switching center indicating that the CCBS facility is possible. The mobile switching center informs the mobile station of the situation by sending a CCBS-POSSIBLE message 404 to the mobile station. If the mobile subscriber decides to wait for the service, a CCBS-REQUEST message 405 is sent from the mobile station, forwarded via the mobile switching center to the HLR 407, and then further to the called subscriber 408.

When the mobile station sends a CCBS-Request message, the wait-time activity 406 starts automatically at the mobile station, and a predefined wait-time service begins. In response, a CCBS-REQUEST-ACK is sent from the called subscriber to the calling subscriber via the HLR and the mobile switching center, steps 409-411. When the state of the called subscriber changes from busy to idle, at step 412, a REMOTE-USER-FREE message 413-414 is sent via the HLR to the mobile switching center, whereupon a CCBS-CALL-INFO is sent to the mobile station 415. A CCBS-INFO-ACK message 416 informs the mobile switching center that the mobile station prefers to use a CCBS call, and for that reason the network may allocate a traffic channel accordingly. In response, the mobile switching center sends a CCBS-RECALL message 417 to the mobile station, and the mobile station alerts the user with an alarm tone. The wait-time activity is interrupted (step 418). When the user picks up the handset of the phone, a CCBS-SET-UP message 419, the content of which being the same as message 400, is sent from the mobile station to the mobile switching center. Thereafter, the messages are used to complete the connection between the calling and the called subscriber according to the figure in steps 420-425. These last messages are known, and they are not essential in view of the actual invention.

The CCBS service is known as such, and interested readers can get a more detailed description of the service, for example, from pages 9-25 in ETSI specifications TS 101 283 V7.0.0 (1999-08). The purpose of giving this example is to demonstrate that the invention can be implemented in different ways. The aim of the invention is that a certain kind of message activates the wait-time service at the terminal equipment of the calling subscriber. It is only when the called subscriber is free that the network allocates a speech path through the air interface.

FIG. 5 illustrates the method of wait-time activity when the CCBS facility is used in a data call connection. The messages 500-524 used in this example correspond to the messages used in FIG. 3 and FIG. 4.

The implementation and embodiments of the present invention have been explained above with various examples. However, it is understood that the invention is not restricted to the details of the embodiments above and that numerous changes and modifications can be made by those skilled in the art without departing from the characteristic features of the invention. For example, video calls are also possible instead of voice or data calls. Some functions can be in a different order. The signaling messages mentioned here are just examples, and there can be many kinds of signaling messages. Further, the invention is not technology-bound. Therefore, it can be used with any transmission technology where the air interface is used for transmissions. It most likely takes place with third generation 3G user equipment based on the Universal Mobile Telecommunications System UMTS currently being developed in Europe. The technology used in a UMTS radio part is WCDMA (Wideband Code Division Multiple Access). However, implementation of the invention can also be carried out in networks using ATM, TCP/IP, or some other technology.

The functionality of the wait-time service can be implemented in the terminal equipment and/or in a module inserted into the terminal equipment, e.g. a SIM card (Subscriber Identity Module).

Different statuses according to the state of the called party or service are possible:

1) free; the establishment of a connection can be completed, 2) busy; the establishment of a connection cannot be completed at the moment, 3) downloading; pages are being loaded e.g. from the Internet, but from the user's viewpoint "nothing is happening", 4) no connection; the establishment of a connection has failed. It is clear that there is no need to use the wait-time service in alternatives 1 and 4. However, in alternatives 2 and 3 wait-time may sometimes last quite long. At least one wait-time service is integrated into the a terminal of the calling party. Therefore, the wait-time service can be started automatically at the said terminal after a predetermined time, which can be 10 seconds, for example. Naturally, the user can start the wait-time service at the terminal or stop it at any time. When the transmission from the called party is completed, the wait-time service is interrupted by an alert signal from the terminal.

Figure 6:
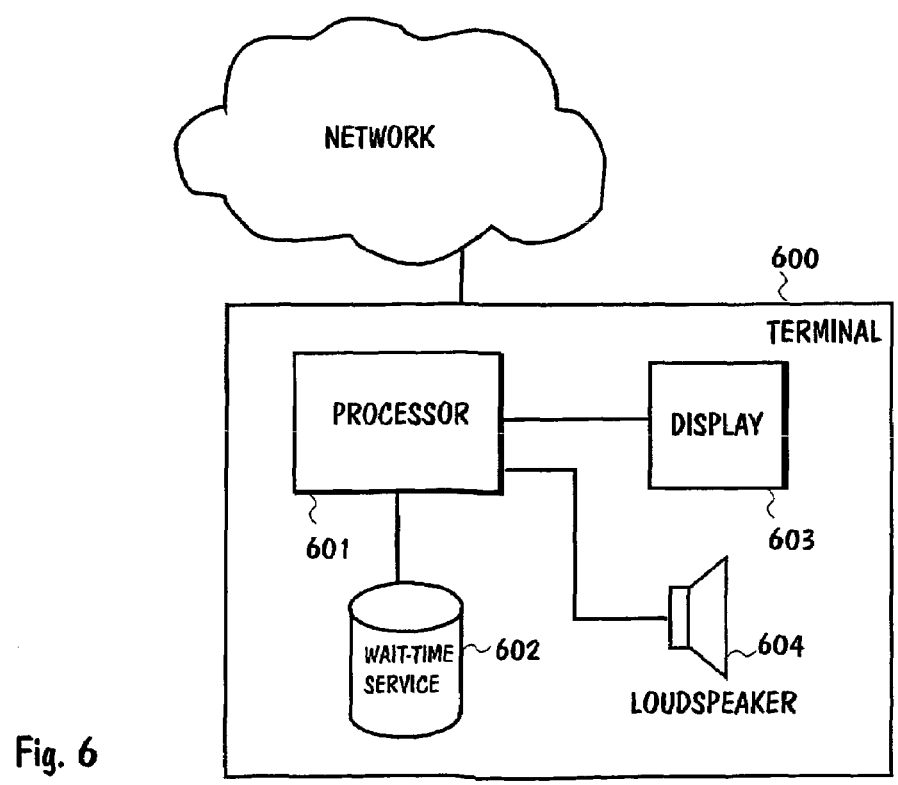
FIG. 6 illustrates a system for executing a wait-time service in a terminal.

FIG. 6 illustrates a system for executing a specific wait-time service in the terminal 600 of the calling party. Software relating to at least one wait-time service is stored in storage 602. Processor 601 is adapted to execute the wait-time service either in response to a certain message from the network or to start activation from the user's terminal. The message from the network includes information about the state of the called party, which can be one of the above mentioned 1-4 alternatives, for example. Depending on the type of wait-time service, it can be displayed on the display 603 and/or heard from the loudspeaker 604 of the terminal.

The wait-time service is described above in terms of connections through the radio path because that has two important advantages: 1) frequencies are used in a more efficient and economic way, and 2) there is no need to compress, encode, or decode the wait-time data. However, it is obvious that the wait-time service can also be used for fixed connections.

The wait-time service can also be activated and executed when data connection has been established between the calling and the called party, especially when the data transmission from the called party (e.g. downloading from the World Wide Web) requires a long wait for the use.

The invention claimed is:

1. A method for providing a wait-time service in a communications network comprising a plurality of user terminals, the method comprising:
   requesting communication between a first, calling party and a second, called party;
   checking the status of the second party;
   informing the first party about the status of the second party;
   in response to the status of the second party being one of predefined statuses, executing a wait-time, service stored in the terminal of the first party until a predefined event is detected;
   transferring the connection control from a first service exchange to a second service exchange;
   monitoring the status of the second party at said second exchange; and
   establishing a connection between the second party and the first party, when said monitoring indicates that the second party has become available.

2. A method as defined in claim 1, wherein the predefined event is the reception of an alert message from the network.

3. A method as defined in claim 1, wherein the predefined event is deactivation of the wait-time service by the first party.

4. A method as defined in claim 1, wherein the predefined event is confirmation of a completed data transmission.

5. A method as defined in claim 1, said method further comprises:
   executing the wait-time service at the terminal of the first party without using a traffic channel for transferring service data.

6. A method as defined in claim 4, further comprising:
   executing the wait-time service at the terminal of the first party as the terminal simultaneously receives data which the terminal fails to use for said service.

7. A method as defined in claim 1, wherein the second party can be any kind of telephone.

8. A method as defined in claim 1, wherein the second party downloads data into the terminal of the first party.

9. A method as defined in claim 5, wherein the connection to be established is a reverse charged connection.

10. A method as defined in claim 1, wherein a set of parameters needed for executing the wait-time service is sent to the first party with information about the status of the second party.

11. A method as defined in claim 1, wherein a set of parameters needed for executing the wait-time service is stored in the terminal of the first party.

12. A method as defined in claim 1, wherein a set of parameters needed for executing the wait-time service is stored in a module inserted into the terminal of the first party.

13. A method as defined in claim 5, wherein the first serving exchange is the same as the second serving exchange.

14. A method as defined in claim 1, wherein the predefined status is "busy".

15. A method as defined in claim 1, wherein the predefined status indicates that data transmission from the second party is in progress.

16. A method as defined in claim 5, wherein when the connection becomes available the wait-time service is interrupted by an alert message.

17. A method as defined in claim 15, wherein when the transmission is completed the wait-time service is interrupted by an alert message.

18. A method as defined in claim 16, further comprising restarting the interrupted wait-time service when the connection between the first and the second party has been released.

19. A method as defined in claim 1, wherein the wait-time service includes provision of audio information.

20. A method as defined in claim 1, wherein the wait-time service includes provision of video information.

21. A method as defined in claim 1, wherein the wait-time service includes provision of textual information.

22. A method as defined in claim 1, wherein the wait-time service includes provision of still-image information.

23. A method as defined in claim 1, wherein the wait-time service is controlled at the terminal of the first terminal.

24. A method as defined in claim 1, wherein the wait-time service is defined for each terminal.

25. A communications system, comprising:
a plurality of user terminals configured to communicate with each other through a network;
a connection analyser functionality in the network configured to inform a firsts calling terminal about the status of a second; called terminal;
a wait-time service integrated into at least said first terminal configured to provide said service at said terminal in response to a predefined event;
a monitoring unit configured to monitor the status of the second called terminal; and
an establishing unit configured to establish a connection between the second called terminal and the first calling terminal, when said monitoring unit indicates that the second called terminal has become available.

26. A communication system as defined in claim 25, wherein the predefined event is the reception of a message from the network, the said message including the status of the second party.

27. A communication system as defined in claim 25, wherein the predefined event is the activation of the wait-time service at the terminal of the first party.

28. A terminal for the communications system, the terminal comprising:
a transmitter configured to transmit a request for the establishment of a connection from said terminal to another terminal;
receiver configured to receive status information indicating the status of another terminal;
a storing unit configured to store a wait-time service; and
a processor configured to execute a wait-time service at the terminal in response to a predefined status of the second party, configured to monitor the status of the second party at said second exchange, and configured to establish a connection between the second party and the first party, when said monitoring indicates that the second party has become available.

29. A terminal for the communication system as defined in claim 28, wherein the predefined status is "busy".

30. The terminal for the communications system as defined in claim 28, wherein the predefined status indicates that data transmission from the second party is in progress.

31. A communications system, comprising:
plurality of user terminals for communicating with each other through a network;
connection analyser functionality in the network for informing a first calling terminal about the status of a second called terminal; and
wait-time service means integrated into at least said first terminal for providing said service at said terminal in response to a predefined event;
monitoring means for monitoring the status of the second called terminal; and
establishing means for establishing a connection between the second called terminal and the first calling terminal, when said monitoring means indicates that the second called terminal has become available.

32. A terminal for the communications system, the terminal comprising:
transmitting means for transmitting a request for the establishment of a connection from said terminal to another terminal; receiving means for receiving status information indicating the status of another terminal;
storing means for storing a wait-time service; and
processor means for executing a wait-time service at the terminal in response to a predefined status of the second party, for monitoring the status of the second party at said second exchange, and for establishing a connection between the second party and the first party, when said monitoring indicates that the second party has become available.

* * * * *